(12) United States Patent
Yoshimura et al.

(10) Patent No.: US 8,931,826 B2
(45) Date of Patent: Jan. 13, 2015

(54) SIDE VEHICLE-BODY STRUCTURE OF VEHICLE

(71) Applicant: Mazda Motor Corporation, Hiroshima (JP)

(72) Inventors: Takashi Yoshimura, Hiroshima (JP); Shigeaki Watanabe, Hiroshima (JP); Sakayu Terada, Hiroshima (JP); Katsuyoshi Ishigame, Hiroshima (JP); Yuichi Sugimura, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/969,373

(22) Filed: Aug. 16, 2013

(65) Prior Publication Data

US 2014/0062130 A1    Mar. 6, 2014

(30) Foreign Application Priority Data

Sep. 5, 2012 (JP) .................................. 2012-194729

(51) Int. Cl.
*B62D 25/20* (2006.01)
*B62D 21/15* (2006.01)

(52) U.S. Cl.
CPC .......... *B62D 21/157* (2013.01); *B62D 25/2036* (2013.01)
USPC .......... 296/187.12; 296/198; 296/209; 296/30

(58) Field of Classification Search
USPC .......... 296/187.12, 203.03, 193.05, 198, 209, 296/30
See application file for complete search history.

(56) References Cited

U.S. PATENT DOCUMENTS

| 4,804,222 | A* | 2/1989 | Sakiyama et al. | 296/203.02 |
|---|---|---|---|---|
| 7,364,225 | B2* | 4/2008 | Tomioka | 296/203.04 |
| 8,690,227 | B2* | 4/2014 | Matsuoka et al. | 296/187.09 |
| 8,814,248 | B2* | 8/2014 | Mildner | 296/75 |
| 2008/0007093 | A1* | 1/2008 | Andou et al. | 296/193.08 |
| 2011/0156447 | A1* | 6/2011 | Matsuoka et al. | 296/203.04 |
| 2013/0049391 | A1* | 2/2013 | Kurogi et al. | 296/30 |
| 2014/0001790 | A1* | 1/2014 | Zischke et al. | 296/187.03 |

FOREIGN PATENT DOCUMENTS

| JP | 406211164 A * | 8/1994 |
|---|---|---|
| JP | 2008-024236 A | 2/2008 |

* cited by examiner

*Primary Examiner* — Jason S Morrow
(74) *Attorney, Agent, or Firm* — Studebaker & Brackett PC (57) ABSTRACT

A load transmitting member comprising a rising face portion rising from a floor panel and a facing face portion facing a portion of the side panel between a rear edge portion of a rear-door opening portion and a rear-wheel house portion and having its short longitudinal width is arranged on an inward side of a side panel. The load transmitting member is fixed to a front portion of the rear-wheel house portion directly or via a bracket. The load transmitting member can be arranged so as not to prevent a smooth ingress/egress action of a passenger, and a proper load-transmission function of the load transmission member when the impact load is inputted to a rear door from the vehicle side can be attained so as to effectively restrain the rear door from coming into a vehicle compartment.

11 Claims, 7 Drawing Sheets

SIDE VEHICLE-BODY STRUCTURE OF
VEHICLE

BACKGROUND OF THE INVENTION

The present invention relates to a side vehicle-body structure of a vehicle which comprises a load transmitting member to transmit an impact load inputted to a rear door from a vehicle side to various vehicle-body portions.

Japanese Patent Laid-Open Publication No. 2008-24236 discloses a structure in which a load transmitting member extending inward, in a vehicle width direction, from a rear edge of a rear-door opening portion is fixed onto a floor panel. According to this structure, since an impact bar of a rear door is received by the load transmitting member from the vehicle inside when an impact load is inputted to the rear door from a vehicle side, the impact load is transmitted from the load transmitting member to various vehicle-body portions through the floor panel. Thereby, the impact load inputted to the rear door can be dispersed effectively to the various vehicle-body portions, so that the rear door can be properly restrained from coming into a vehicle compartment for the passenger's protection.

According to the structure of the above-described patent document, however, since the load transmitting member has a specified thickness, in a vehicle longitudinal direction, and is arranged to project beyond an edge of the rear-door opening portion in the vehicle longitudinal direction, a smooth ingress/egress action of the passenger may be prevented by this load transmitting member improperly. Meanwhile, it may be considered that the rear edge of the rear-door opening portion is arranged at a further forward position so that the load transmitting member can be positioned in back of the rear edge of the rear-door opening portion. In this case, however, an area of the rear-door opening portion may be improperly reduced, which deteriorates the passenger's smooth ingress/egress action as well.

Then, it may be considered that the longitudinal thickness of the load transmitting member is designed to be thinner in order to properly arrange the load transmitting member in a narrow space, in the vehicle longitudinal direction, between the rear edge of the rear-door opening portion and a front edge of a rear-wheel house.

In this case, however, there is a concern that the load transmitting member may easily fall down forward or rearward when the impact load is inputted to the rear door from the vehicle side, so that the proper load-transmission function of the load transmitting member may not be attained sufficiently.

Moreover, since the load transmitting member may easily fall down forward or rearward, it may be considered that the load transmitting member is arranged to be offset inward, in the vehicle width direction, from the rear-wheel house and also to further extend rearward. In this case, however, a gap, in the vehicle width direction, between the rear door and the load transmitting member expands improperly, so that the rear door may improperly easily come into the vehicle compartment.

SUMMARY OF THE INVENTION

An object of the present invention is to provide a side vehicle-body structure of a vehicle which can properly arrange the load transmitting member so as not to prevent the smooth ingress/egress action of the passenger at a rear seat and also effectively attain the proper load-transmission function of the load transmission member when the impact load is inputted to the rear door from the vehicle side, thereby effectively restraining the rear door from coming into the vehicle compartment.

According to the present invention, there is provided a side vehicle-body structure of a vehicle, comprising a side panel constituting a vehicle-body side face positioned in back of a rear-door opening portion, a rear-wheel house portion formed at the side panel and protruding inward in a vehicle width direction, a floor panel constituting a vehicle-body bottom face, and a load transmitting member arranged on an inward side, in the vehicle width direction, of the side panel so as to transmit an impact load inputted to a rear door from a vehicle side, wherein the load transmitting member comprises a rising face portion which rises from the floor panel and a facing face portion which faces a portion of the side panel between a rear edge portion of the rear-door opening portion and the rear-wheel house portion, a longitudinal width of the load transmitting member is shorter than a vertical width of the load transmitting member, and the load transmitting member is fixed to a front portion of the rear-wheel house portion directly or via a bracket.

According to the present invention, since the load transmitting member transmitting the impact load inputted to the rear door from the vehicle side to the floor panel has its longitudinal width being shorter than its vertical width, this member can be properly arranged in the narrow space, in the vehicle longitudinal direction, between the rear edge of the rear-door opening portion and the front edge of the rear-wheel house portion. Accordingly, it can be properly prevented that the load transmitting member projects beyond the edge of the rear-door opening portion in the vehicle longitudinal direction, without improperly reducing the area of the rear-door opening portion, so that the smooth ingress/egress action of the passenger at the rear seat can be properly ensured. Further, since the load transmitting member is fixed to the front portion of the rear-wheel house portion directly or via the bracket, it can be prevented that the load transmitting member falls down in the vehicle longitudinal direction when the impact load is inputted to the rear door from the vehicle side, so that the proper load-transmission function of the load transmitting member can be attained. Accordingly, the impact load inputted to the rear door from the vehicle side can be effectively dispersed to various vehicle-body portions by way of the load transmitting member, so that the rear door can be effectively restrained from coming into the vehicle compartment.

According to an embodiment of the present invention, the load transmitting member is fixed to the floor panel at a single or plural fastening portions thereof by means of a fastening member, the load transmitting member is further fixed to the bracket or the rear-wheel house portion at a single or plural fastening portions thereof by means of another fastening member, and the single fastening portion or the most inward-located portion of the plural fastening portions of the load transmitting member fixed to the floor panel is located at an inward position, in the vehicle width direction, relative to the single fastening portion or the most inward-located portion of the plural fastening portions of the load transmitting member fixed to the bracket or the rear-wheel house portion. Thereby, since the single fastening portion or the most inward-located portion of the plural fastening portions of the load transmitting member fixed to the floor panel is located at the inward position, in the vehicle width direction, relative to the single fastening portion or the most inward-located portion of the plural fastening portions of the load transmitting member fixed to the bracket or the rear-wheel house portion, even when the load transmitting member receives the impact load and thereby some moment occurs in a specified direction which may cause a rotation of the load transmitting member around the single fastening portion or the most inward-located portion of the plural fastening portions of the load transmitting member fixed to the floor panel (i.e., in a specified direction which may cause inward-falling down of the load transmitting member), the load transmitting member can be effectively restrained from falling down inward in the vehicle width direction improperly greatly. Accordingly, the stability of attaching of the load transmitting member at the time of the impact load being inputted from the vehicle side can be improved.

According to another embodiment of the present invention, the rising face portion of the load transmitting member is arranged substantially along a vertical direction in a vehicle side view. Thereby, compared with a case in which the rising face portion is arranged to slant forward or rearward, falling down, in the vehicle longitudinal direction, of the load transmitting member can be prevented surely.

According to another embodiment of the present invention, a rear side frame having a closed cross section and extending in a vehicle longitudinal direction is arranged along a lower face of the floor panel to pass below the load transmitting member, a bulkhead is arranged inside the closed cross section of the rear side frame and joined to an inner face of the rear side frame, and the bulkhead and the load transmitting member are arranged to overlap each other in the vehicle longitudinal direction. Thereby, since the bulkhead is arranged inside the closed cross section of the rear side frame passing below the load transmitting member and the bulkhead and the load transmitting member are arranged to overlap each other in the vehicle longitudinal direction, collapsing of a shape of the cross section of the rear side frame at a load transmission portion where the impact load is transmitted from the load transmitting member to the rear side frame can be effectively restrained by the bulkhead. Thereby, appropriate load transmission at the rear side frame, and also appropriate load transmission from the rear side frame to the opposite side, in the vehicle width direction, by way of a cross member can be attained properly. Accordingly, when the impact load is inputted to the rear door from the vehicle side, more effective load dispersion can be attained, so that the rear door can be restrained from coming into the vehicle compartment more effectively.

According to another embodiment of the present invention, the load transmitting member has a lower-end flange portion placed on an upper face of the floor panel at a lower end thereof, the bulkhead has an upper-end flange portion contacting the lower face of the floor panel at an upper end thereof, and the lower-end flange portion of the load transmitting member and the upper-end flange portion of the bulkhead are fastened to each other, via the floor panel, at a single or plural fastening portions thereof by means of a fastening member. Thereby, since the lower-end flange portion of the load transmitting member and the upper-end flange portion of the bulkhead are fastened to each other, via the floor panel, at the single or the plural fastening portions thereof by means of the fastening member, the impact load can be smoothly transmitted from the load transmitting member to the rear side frame by way of the fastening member and the bulkhead. Accordingly, when the impact load is inputted to the rear door from the vehicle side, the load dispersion by using the rear side frame can be attained more effectively.

According to another embodiment of the present invention, the bulkhead has a bead which is formed to extend downward from a vicinity of the single fastening portion or the most inward-located portion of the plural fastening portions of the upper-end flange portion of the bulkhead. When the impact load inputted from the vehicle side is transmitted from the load transmission member to the floor panel, a downward load may concentrate easily due to the above-described moment occurring at the single fastening portion or the most inward-located portion of the plural fastening portions of the load transmitting member fixed to the floor panel. Herein, the above-described downward load can be transmitted further downward smoothly by way of the above-described bead. Accordingly, the load transmission from the load transmitting member to the rear side frame can be attained more properly.

Other features, aspects, and advantages of the present invention will become apparent from the following description which refers to the accompanying drawings.

DETAILED DESCRIPTION OF THE INVENTION

Hereinafter, a preferred embodiment of the present invention will be described specifically referring to the accompanying drawings. In the following descriptions, terms showing directions of "front", "rear", "longitudinal", "right", "left", "lateral", and so on mean respective directions in a case in which an advance direction of a vehicle is considered as a "front" direction.

In the following description, the terms regarding directions, such as "front", "rear", "longitudinal", "right", "left", or "lateral", mean respective directions in a state where a vehicle's advancing direction is considered as a "front" direction, except particular cases with notes.

Figure 1:
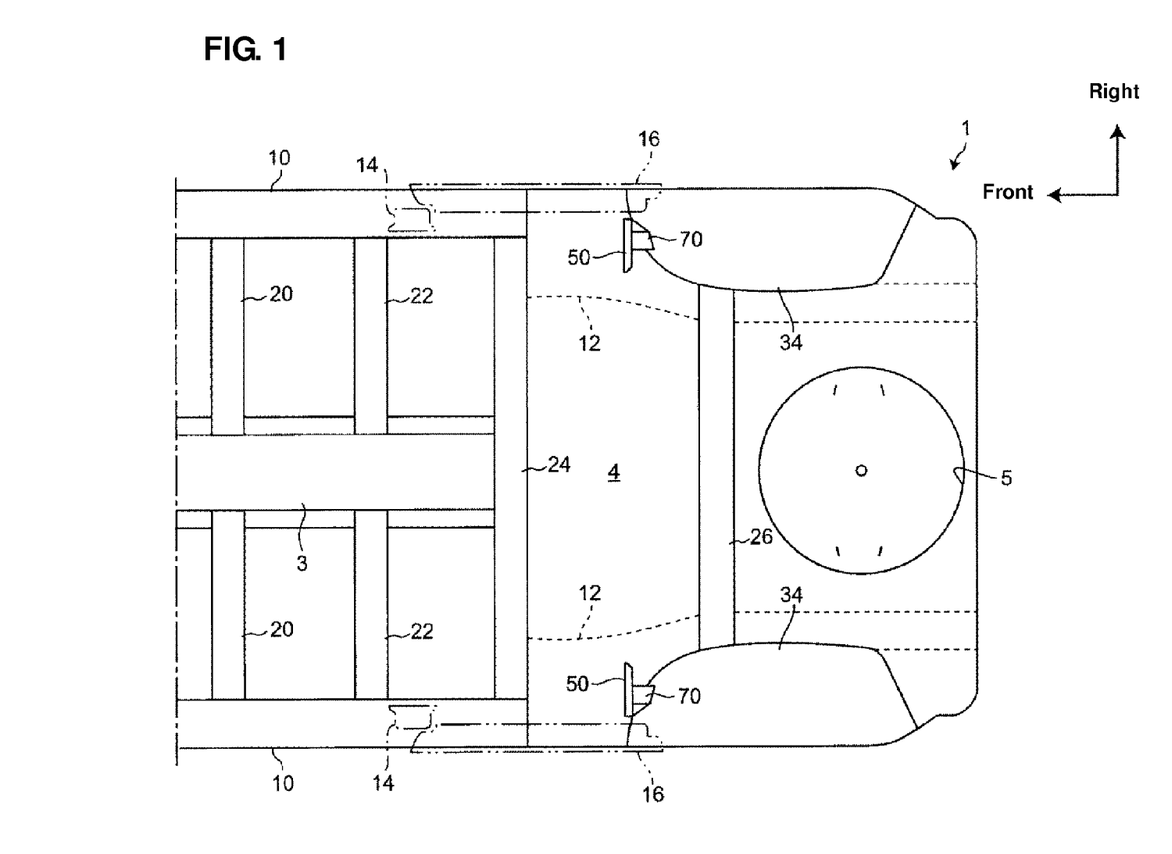
FIG. 1 is a plan view showing a floor portion of a vehicle equipped with a side vehicle-body structure according to an embodiment of the present invention.

FIG. 1 is a plan view showing a floor portion of a vehicle 1 equipped with a side vehicle-body structure according to the present embodiment. The floor portion of the vehicle 1 is constituted by a floor panel 4 as shown in FIG. 1. A tunnel reinforcement 3 which extends longitudinally from a dash panel (not illustrated) to a floor portion of a rear seat is provided at a central portion, in a vehicle width direction, of the floor panel 4, and a spare tire pan 5 is provided at a rear portion of the floor panel 4.

Side sills 10 extending longitudinally are provided at right-and-left both side portions of the floor panel 4. Rear-wheel house portions 34 storing rear wheels are provided in back of the side sills 10, and a pair of right-and-left rear side frames 12 which extend longitudinally, passing on the inside, in the vehicle width direction, of the rear-wheel house portions 34, are provided along a lower face of the floor panel 4.

Plural cross members 20, 22, 24, 26 extending in the vehicle width direction are arranged on the floor panel 4. Specifically, there are provided, in order from the front, No. 2 cross member 20 and No. 2.5 cross member 22 which are provided to extend between the right-and-left side sills 10 and the tunnel reinforcement 3, No. 3 cross member 24 which is provided to extend between the right-and-left side sills 10 in back of the tunnel reinforcement 3, and No. 4 cross member 26 which is provided to extend between the right-and-left rear-wheel house portions 34.

Further, a gusset for load transmission 50 is arranged on the inside, in the vehicle width direction, of a rear portion of the rear door 16, and this gusset 50 is fixed onto an upper face of the floor panel 4. Thus, when an impact load is inputted to the rear door 16 from a vehicle side, this impact load is received by the gusset 50 from the vehicle inside in the vehicle width direction, so that the impact load can be transmitted from the gusset 50 to the floor panel 4. Moreover, the impact load is transmitted to the above-described rear side frame 12 passing below the gusset 50, and then also transmitted from this rear side frame 12 to the other rear side frame 12 by way of the No. 3 cross member 24 and the No. 4 cross member 26. Accordingly, the impact load inputted to the rear door 16 from the vehicle side can be effectively dispersed to various vehicle-body portions including vehicle-body portions on the opposite side in the vehicle width direction, so that the rear door 16 can be effectively restrained from coming into the vehicle compartment.

A structure of the gusset 50 and its surrounding portion will be described referring to FIGS. 2 through 7.

Figure 2:
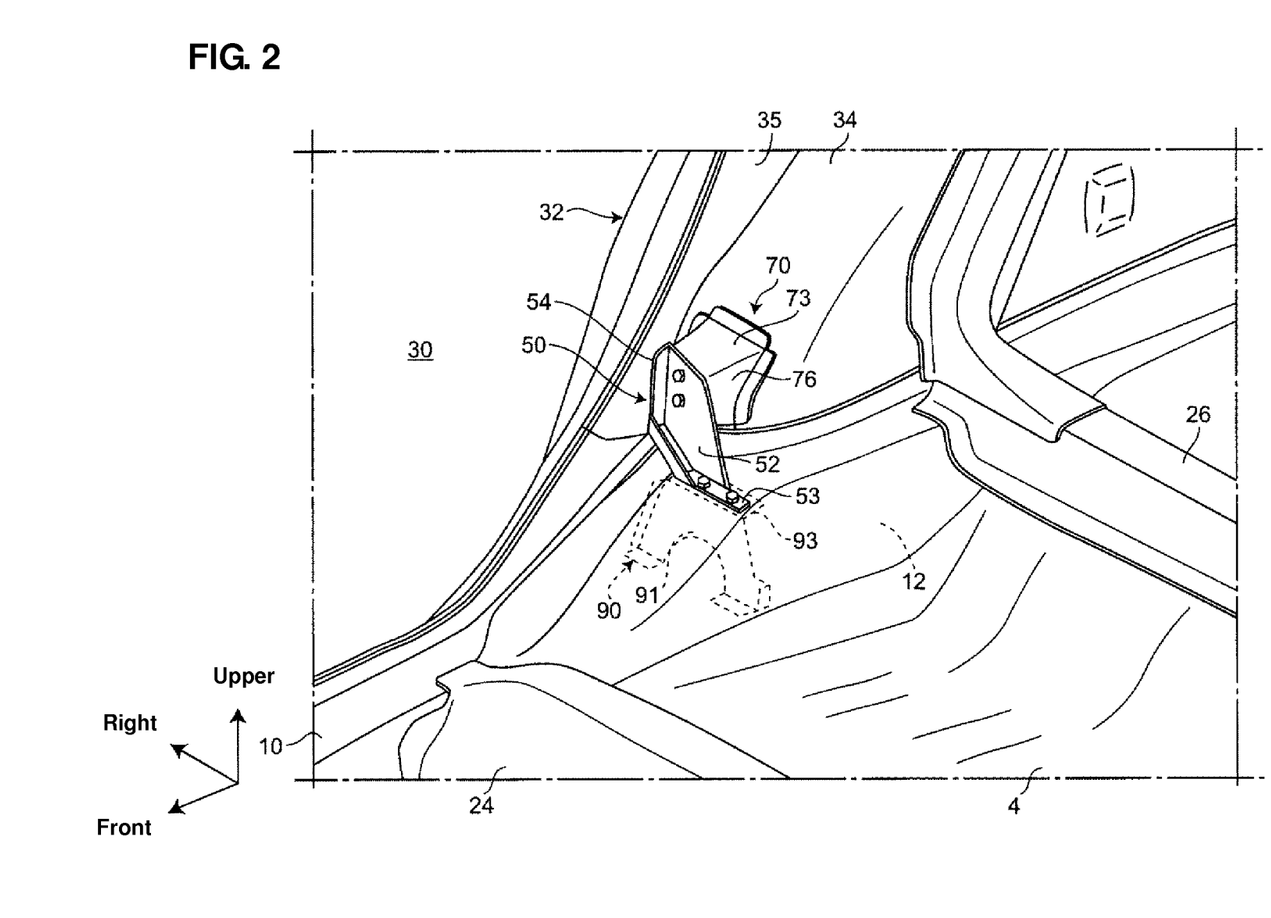
FIG. 2 is a perspective view of a gusset for load transmission attached to the floor portion shown in FIG. 1 and its surrounding portion, when viewed obliquely from the front inside a vehicle compartment.
Figure 3:
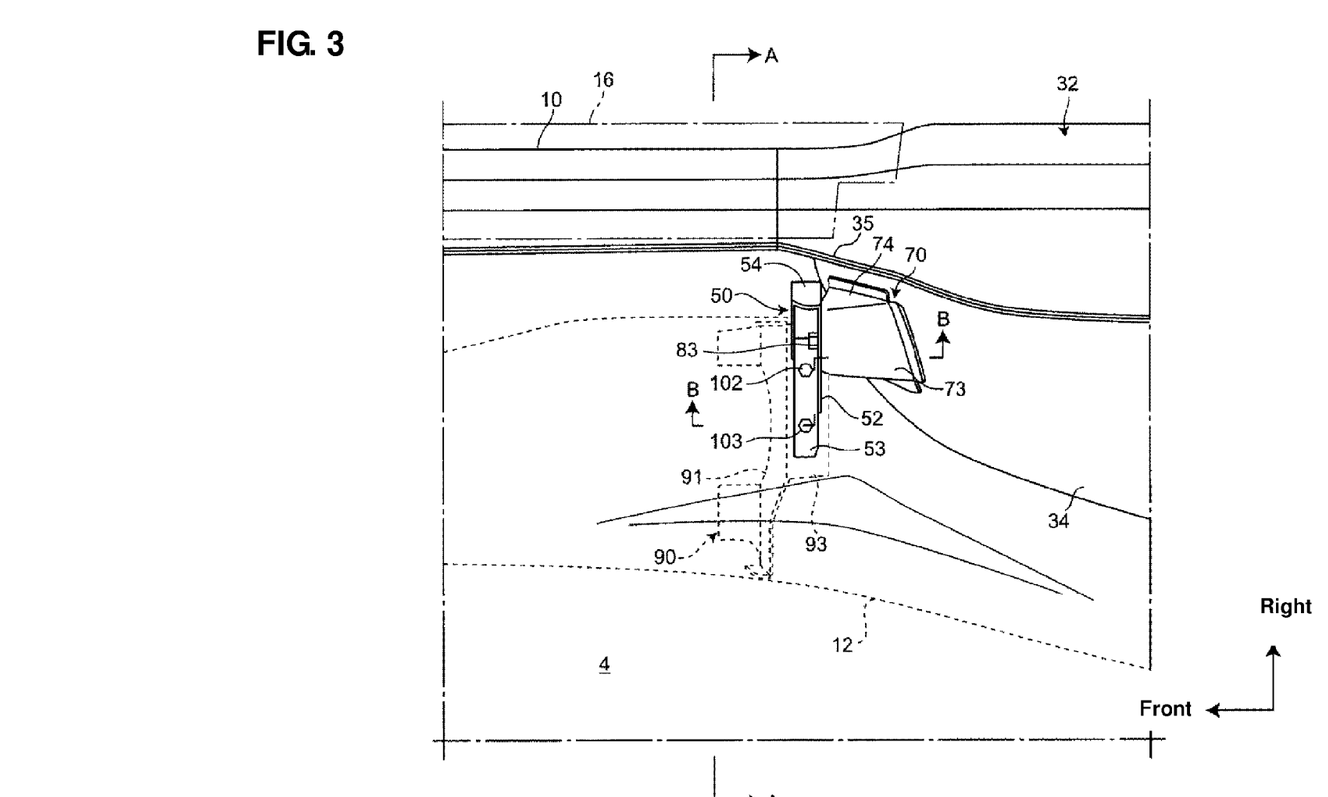
FIG. 3 is a plan view showing the gusset shown in FIG. 2 and its surrounding portion.
Figure 4:
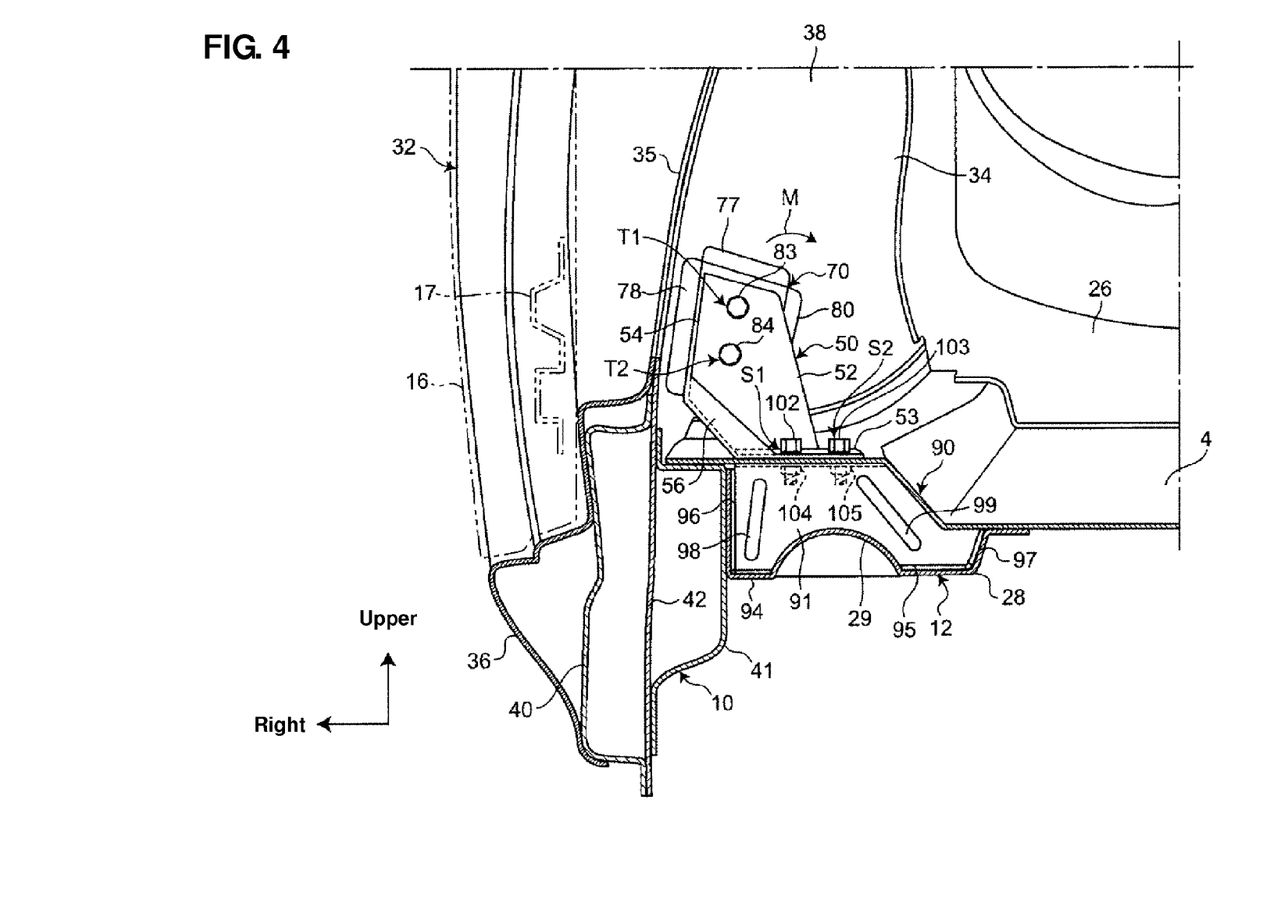
FIG. 4 is a sectional view taken along line A-A of FIG. 3.
Figure 5:
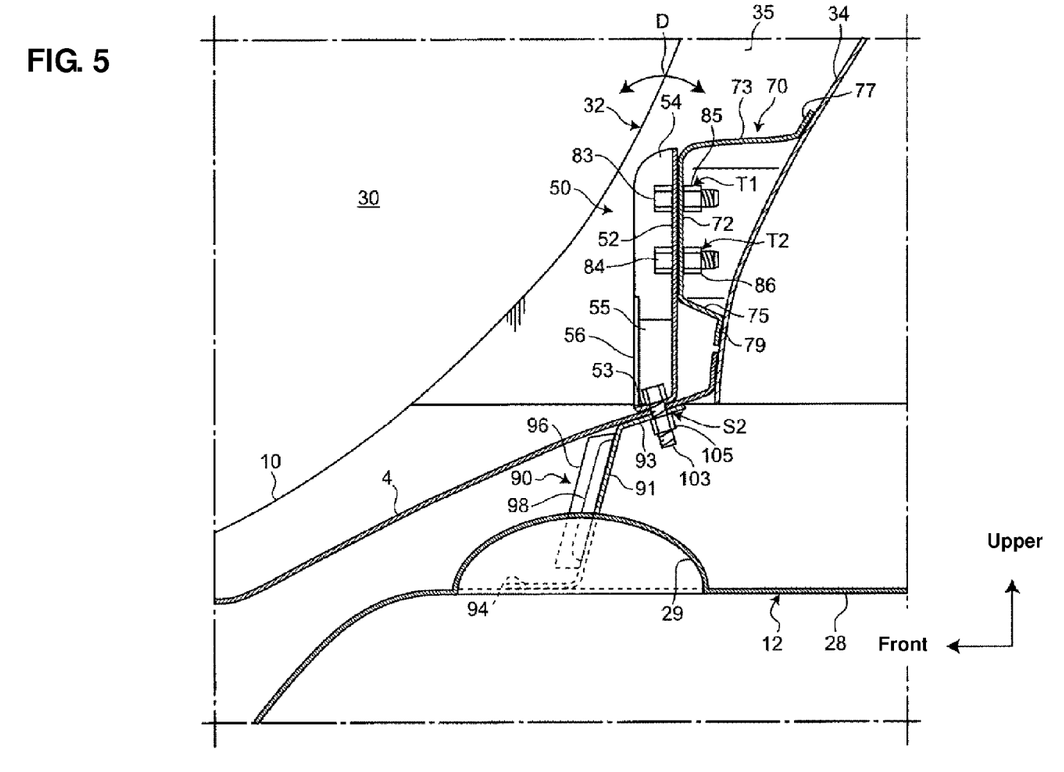
FIG. 5 is a sectional view taken along line B-B of FIG. 3.
Figure 6:
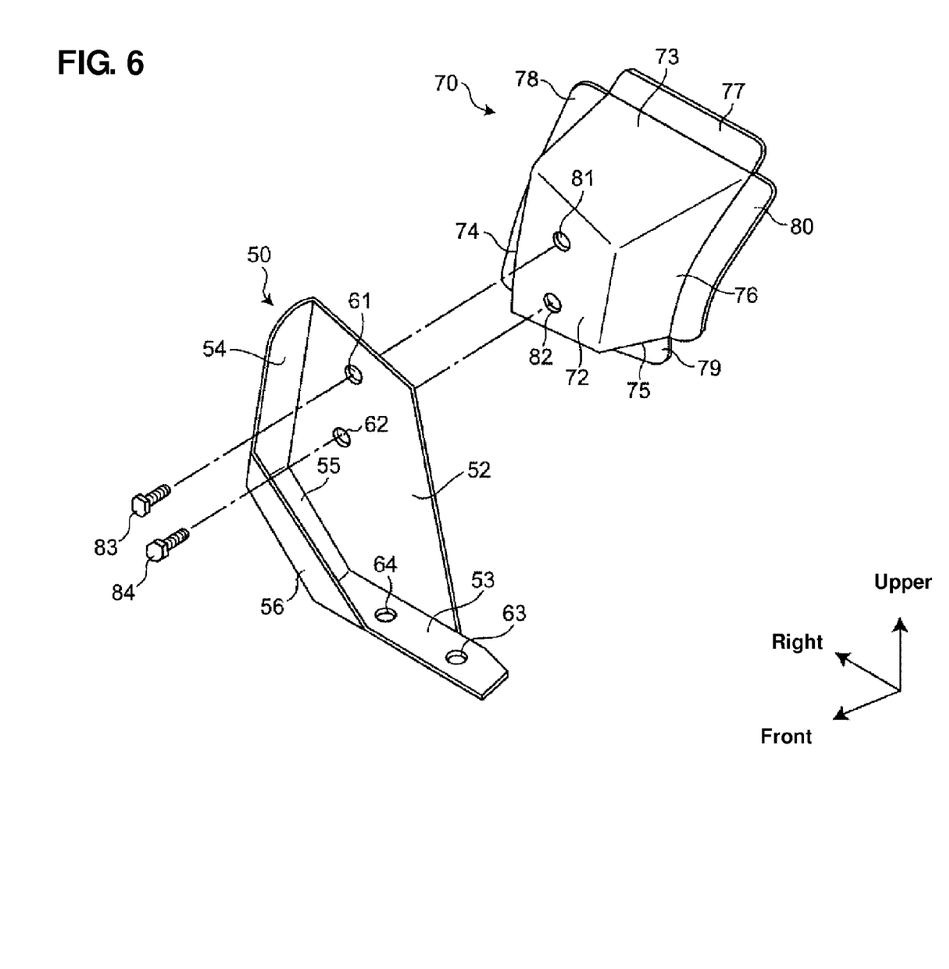
FIG. 6 is a perspective view of the gusset shown in FIG. 2 and its bracket for attachment.
Figure 7:
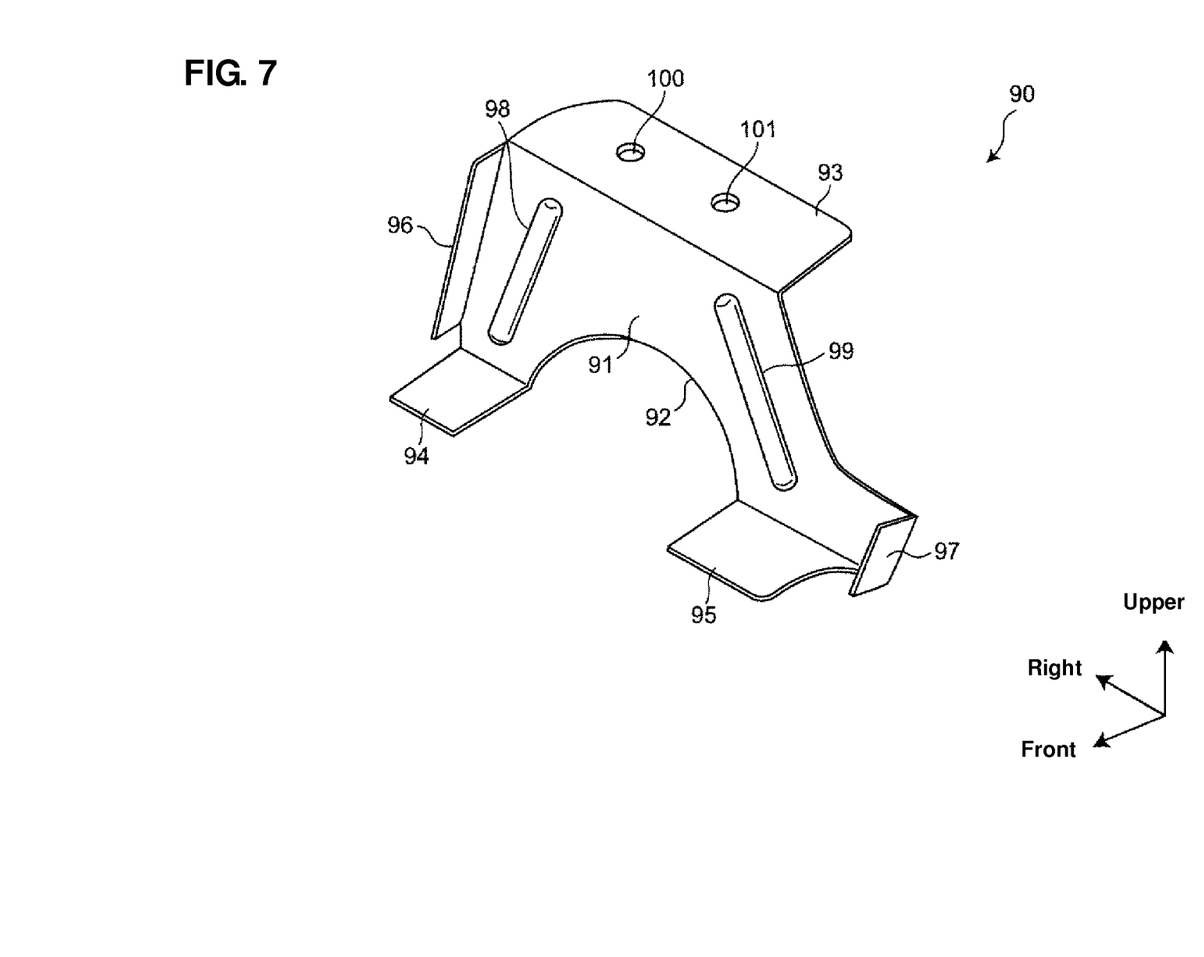
FIG. 7 is a perspective view showing a bulkhead arranged inside a closed cross section of a rear side frame passing below the gusset shown in FIG. 2.

FIG. 2 is a perspective view of the right-side gusset 50 and its surrounding portion, when viewed obliquely from the front inside the vehicle compartment, FIG. 3 is a plan view showing the right-side gusset 50 and its surrounding portion, FIG. 4 is a sectional view taken along line A-A of FIG. 3, and FIG. 5 is a sectional view taken along line B-B of FIG. 3. Further, FIG. 6 is a perspective view of the right-side gusset 50 and its bracket for attachment 70, and FIG. 7 is a perspective view showing a bulkhead 90 arranged inside a closed cross section of the right-side rear side frame 12.

Herein, while FIGS. 2 through 7 illustrate only the structure of the gusset 50 arranged on the right side of the vehicle and its surrounding portion, without any illustration about a structure of the left side of the vehicle, the structure of the vehicle's left side is symmetrical to the one of the vehicle's right side.

As shown in FIG. 2, a pair of right-and-left side panels 32 which constitute vehicle-body side faces located in back of rear-door opening portions 30 are provided at right-and-left both side portions of the rear portion of the vehicle 1, and the above-described floor panel 4 is arranged between the pair of right-and-left side panels 32. The above-described rear-wheel house portion 34 is formed at the side panel 32 to protrude in the vehicle width direction.

The side panel 32 is continuous rearward from the side sill 10, and forms the above-described rear-door opening portion 30 together with the side sill 10, a center pillar 14 (see FIG. 1), and a roof rail (not illustrated). Specifically, a rear edge portion of the rear-door opening portion 30 is constituted by an opening-forming portion 35 which is formed at a front edge portion of the side panel 32. Herein, a weather strip (not illustrated) is attached to the opening-forming portion 35.

The side panel 32 comprises, as shown in FIG. 4, a side panel outer 36 which constitutes an outside surface of the vehicle-body side face, and a rear-wheel house outer (not illustrated) and a rear-wheel house inner 38 which are joined together to constitute the rear-wheel house portion 34.

The side sill 10 comprises a side sill outer 40 and a side sill inner 41 which are joined together so as to form a closed cross section extending longitudinally, and a side sill reinforcement 42 which is arranged inside this closed cross section so as to partition this closed cross section into right and left parts.

Further, the rear side frame 12 comprises a rear side frame member 28 which extends longitudinally and has an inverse-U-shaped cross section extending longitudinally. The rear side frame member 28 is joined to an inward side face of the side sill inner 41 and the lower face of the floor panel 4, so that the closed cross section of the rear side frame 12 is formed by the rear side frame member 28, the side sill inner 41, and the floor panel 4. The closed cross section of the rear side frame 12 extends longitudinally, passing below the gusset 50. Herein, an upward protrusion portion 29 is formed at a lower face of the rear side frame member 28 to avoid any interference with a suspension support member.

As shown in FIGS. 2 through 5, the gusset 50 is arranged on the inside, in the vehicle width direction, of the opening-forming portion 35 of the side panel 32. Herein, a rear seat (not illustrated) is arranged beside, i.e., on the inside, in the vehicle width direction, of the gusset 50, and a wheel-house trim (not illustrated) is arranged between the rear seat and the side panel 32. This wheel-house trim is arranged to cover over the gusset 50 so that the gusset 50 is not exposed.

The shape of the gusset 50 will be described referring to FIG. 6.

The gusset 50 comprises a rising face portion 52 which rises from the floor panel 4. The rising face portion 52 is arranged substantially in parallel to the vehicle width direction along the vertical direction in the side view of the vehicle (see FIG. 5). An inward edge portion, in the vehicle width direction, of the rising face portion 52 has a contour in which it slants inward and downward in its front view. An outward edge portion, in the vehicle width direction, of the rising face portion 52 has a contour in which it bends in an inverse-V shape with a central portion, in the vertical direction, thereof projecting outward in the vehicle width direction in its front view. A lower slant portion of the outward edge portion of the rising face portion 52 slants inward and downward, and a slant angle of this lower slant portion is gentler than that of the inward edge portion of the rising face portion 52.

The rising face portion 52 has a pair of upper-and-lower bolt-through holes 61, 62, for example, and the gusset 50 is fixed to the bracket 70 with bolts 83, 84 inserted into the bolt-through holes 61, 62. The bolt-through holes 61, 62 are arranged above the central portion, in the vertical direction, of the rising face portion 52.

A lower-end flange portion 53 which is placed on the upper face of the floor panel 4 is provided at a lower end of the gusset 50. The lower-end flange portion 53 has a long-and-narrow shape in the vehicle width direction, and a lower edge portion of the rising face portion 52 is continuous to a rear edge portion of the lower-end flange portion 53. The lower-end flange portion 53 is provided to extend inward relative to an inward end portion of the rising face portion 52 in the vehicle width direction.

The lower-end flange portion 53 has a pair of right-and-left bolt-through holes 63, 64, for example, and the gusset 50 is fixed to the floor panel 4 by means of bolts 102, 103 (see FIG. 4) inserted into the bolt-through holes 63, 64. The bolt-through holes 63, 64 are provided at a central portion and an inward portion, in the vehicle width direction, of the lower-end flange portion 33.

At an outward end portion of the gusset 50 is provided a facing face portion 54 which faces a specified portion of the side panel 32 between the rear edge portion of the rear-door opening portion 30 and the rear-wheel house portion 34. Specifically, the facing face portion 54 is arranged to face the opening-forming portion 35 of the side panel 32 (see FIG. 4).

The facing face portion 54 has a long-and-narrow shape in the vertical direction, and a rear edge portion of the facing face portion 54 is continuous to the outward edge portion of the rising face portion 52. The width, in the longitudinal direction, of the facing face portion 54 is substantially the same as that of the lower-end flange portion 53.

A lower end portion of the facing face portion 54 is arranged on the outside, in the vehicle width direction, of as well as above the lower-end flange portion 53. The lower end portion of the facing face portion 54 and an outward end portion, in the vehicle width direction, of the lower-end flange portion 53 are connected to each other via a slant face portion 55 which extends obliquely outwear and upward. This slant face portion 55 has a long-and-narrow shape. The width, in the longitudinal direction, of the slant face portion 55 is substantially the same as that of the lower-end flange portion 53 and the facing face portion 54.

Further, the gusset 50 comprises a front face portion 56 which faces a front face of the rising face portion 52. This face portion 56 rises from front edge portions of the lower-end flange portion 53 and the slant face portion 55. An upper edge of the front face portion 56 has a contour in which it slants downward and inward in the vehicle width direction in its front view. Also, the upper edge of the front face portion 56 is arranged below the bolt-through holes 61, 62 of the rising face portion 52 so that fastening work of the bolts 83, 84 from the front may not be prevented by the front face portion 56.

The gusset 50 constituted as described above is, as shown in FIG. 4, arranged at a position which can make the gusset 50 receive the impact load inputted to the rear door 16 from the vehicle side and fixed onto the floor panel 4. In this attachment state, the facing face portion 54 of the gusset 50 is arranged substantially in parallel to the opening-forming portion 35 of the side panel 32 with a specified gap. Herein, the above-described weather strip, harnesses and the like are arranged in a space between the facing face portion 54 and the opening-forming portion 35.

Further, a rear portion of an impact bar of the rear door 16 is arranged on the outside, in the vehicle width direction, of the facing face portion 54, and the facing face portion 54 and the impact bar 17 are arranged so as to overlap each other in the longitudinal direction as well as the vertical direction. Accordingly, when the impact load is inputted to the rear door 16 from the vehicle side, the impact bar 17 of the rear door 16 is received by the facing face portion 54 of the gusset 50 via the opening-forming portion 35 of the side panel 32. Thereby, the load transmission from the rear door 16 to the gusset 50 can be properly attained, and this load is further transmitted to the floor panel 4 and the rear side frame 12.

Moreover, the gusset 50 constituted as described above is configured such that its longitudinal width is shorter than its vertical width (see FIG. 5), and its longitudinal width is shorter than its lateral width (see FIG. 3). Thus, the gusset 50 has a flat shape with its thin longitudinal thickness, so that the gusset 5 can be easily arranged in a narrow space, in the vehicle longitudinal direction, between the rear edge of the rear-door opening portion 30 and a front edge of the rear-wheel house portion 34 as shown in FIG. 5. Accordingly, it can be properly prevented that the gusset 50 projects beyond the edge of the rear-door opening portion 30, without improperly reducing the area of the rear-door opening portion 30, so that the smooth ingress/egress action of the passenger at the rear seat can be properly ensured.

Meanwhile, there is a problem in that the gusset 50 having its thin longitudinal thickness may easily fall down forward or rearward when receiving the impact load.

According to the present embodiment, the gusset 50 is fixed to the front portion of the rear-wheel house portion 34 via the bracket 70 as shown in FIG. 5. Thereby, the gusset 50, despite its flat shape with the thin longitudinal thickness, can be prevented from falling down in the longitudinal direction (in an arrow D direction of FIG. 5) when the impact load is inputted from the vehicle side. Further, since the rising face portion 52 of the gusset 50 is arranged substantially along the vertical direction in the vehicle side view, compared with a case in which this rising face portion 52 is arranged to slant forward or rearward, falling down, in the longitudinal direction, of the gusset 50 can be prevented surely. Also, compared with a case in which this rising face portion 52 is arranged to slant forward, it can be avoided properly that the gusset 50 projects beyond the edge of the rear-door opening portion 30 in the side view, and compared with a case in which this rising face portion 52 is arranged to slant rearward, the amount of lapping of the impact bar 17 of the rear door 16 and the gusset 50 in the longitudinal direction can be ensured properly.

The shape of the gusset 70 will be described referring to FIG. 6 again.

The bracket 70 has its whole boxy shape in which it opens rearward. Specifically, the bracket 70 comprises a front face portion 72 to which the gusset 50 is fixed and plural side face portions 73, 74, 75, 76 (73-76) which extend rearward from the front face portion 72.

The front face portion 72 of the bracket 70 is rectangular, for example. The front face portion 72 has a pair of upper-and-lower bolt through holes 81, 82, for example, and the above-described bolts 83, 84 are inserted into the bolt through holes 81, 82, respectively. Nuts 85, 86 for fastening the bolts 83, 84 (see FIG. 5) are welded to a rear face of the front face portion 72. Thus, as shown in FIG. 5, the rising face portion 52 of the gusset 50 is fixed to the front face portion 72 of the bracket 70 by fastening of the bolts 83, 84 and the nuts 85, 86 at a pair of upper-and-lower fastening portions T1, T2. The upper fastening portion T1 is arranged at a slightly-inward position, in the vehicle width direction, relative to the lower fastening portion T2.

The side face portions 73-76 of the bracket 70 include the upper side face portion 73 extending rearward from an upper edge of the front face portion 72, the outward side face portion 74 extending rearward from an outward edge portion of the front face portion 72, the lower side face portion 75 extending rearward from a lower edge of the front face portion 72, and the inward side face portion 76 extending rearward from an inward edge portion of the front face portion 72. Flange portions 77, 78, 79, 80 (77-80) are provided at respective ends of the side face portions 73-76. These flange portions 77-80 are fixed to the front portion of the rear-wheel house portion 34 by welding, for example.

Herein, if the closed cross section of the rear side frame 12 deforms greatly when the impact load is transmitted from the gusset 50 to the rear side frame 12, stresses concentrate on this deformation portion, so that the proper load-transmission function of the rear side frame 12 may not be attained sufficiently.

Therefore, according to the present embodiment, as shown in FIGS. 2 through 5, the bulkhead 90 joined to the inner face of the rear side frame 12 is arranged inside the closed cross section of the rear side frame 12. Further, the bulkhead 90 and the gusset 50 are arranged so as to overlap each other in the longitudinal direction. Thereby, when the impact load is transmitted to the gusset 50 from the vehicle side via the rear door 16, collapsing of the shape of the cross section of the rear side frame 12 at a load transmission portion where the impact load is transmitted from the gusset 50 to the rear side frame 12 can be effectively restrained by the bulkhead 90. Thereby, appropriate load transmission at the rear side frame 12, and also appropriate load transmission from the rear side frame 12 to the opposite side, in the vehicle width direction, by way of the No. 3 cross member 24 and the No. 4 cross member 26 (see FIG. 1) can be attained properly.

The shape of the bulkhead 90 will be described referring to FIG. 7.

The bracket 90 comprises a partition wall portion 91 which partitions the closed cross section of the rear side frame 12 longitudinally and plural side flange portions 93, 94, 95, 96, 97 (93-97) which are provided at a peripheral portion of the partition wall portion 91.

The partition wall portion 90 has a shape which substantially march the shape of the cross section of the rear side frame 12, and a notch 92, which is of a half-circular shape, for example, is formed at a lower edge portion of the partition wall portion 91 so as to avoid any improper interference with the above-described protrusion portion 29 of the rear side frame member 28. At the partition wall portion 91 is formed a pair of right-and-left beads 98, 99, for example. The beads 98, 99 are formed to project forward, for example, from the partition wall portion 91. The outward bead 98 is formed to extend substantially vertically at a portion of the partition wall portion 91 which is positioned on the outside, in the vehicle width direction, of the outward bolt through hole 100. The inward bead 99 is arranged on the inside, in the vehicle width direction, of the inward bolt through hole 101, and formed to slant downward and inward in the vehicle width direction.

The plural flange portions 93-97 of the bulkhead 90 include the upper-end flange portion 93 provided at an upper end of the bulkhead 90, a pair of right-and-left lower-end flange portions 94, 95 provided at a lower end of the bulkhead 90, the outward flange portion 96 provided at an outward-end portion of the bulkhead 90, and the inward flange portion 97 provided at an inward-end portion of the bulkhead 90.

The upper-end flange portion 93 is provided to extend rearward from the upper edge of the partition wall portion 91, and arranged to contact the lower face of the floor panel 4. At the upper-end flange portion 93 is formed a pair of right-and-left bolt through holes 100, 101, for example. As shown in FIG. 4, the above-described bolts 102, 103 are inserted into the bolt through holes 100, 101. Also, nuts 104, 105 for fastening the bolts 102, 103 are welded to a lower face of the upper-end flange portion 93. The upper-end flange portion 93 and the lower-end flange portion 53 of the gusset 50 are arranged via the floor panel 4 so as to overlap each other, and fastened at a pair of right-and-left fastening portions S1, S2 with the bolts 102, 103 and the nuts 104, 105. Thereby, the impact load is smoothly transmitted from the gusset 50 to the rear side frame 12 by way of the bolts 102, 103 and the bulkhead 90.

Returning to FIG. 7, the lower-end flange portions 94, 95 are provided to extend forward from a lower edge of the partition wall portion 91, respectively, at both sides of the above-described notch portion 92. The lower-end flange portions 94, 95 are welded onto an upper face of a bottom portion of the rear side frame member 28 (see FIGS. 4 and 5).

The outward flange portion 96 is provided to extend forward from the outward edge portion of the partition wall portion 91. This outward flange portion 96 is welded onto an inner face of an outward side face, in the vehicle width direction, of the rear side frame member 28 (see FIG. 4).

The inward flange portion 97 is provided to extend forward from the inward edge portion of the partition wall portion 91. This inward flange portion 97 is welded onto an inner face of an inward side face, in the vehicle width direction, of the rear side frame member 28 (see FIG. 4).

Since the bulkhead 90 constituted as described above is, as shown in FIG. 4, arranged inside the closed cross section of the rear side frame 12 at the load transmission portion where the impact load is transmitted from the gusset 50 to the rear side frame 12, collapsing of the shape of this closed cross section can be effectively restrained by this bulkhead 90.

In the attachment state shown in FIG. 4, the inward fastening portion S2 for the gusset 50 and the floor panel 4 is arranged on the inward side, in the vehicle width direction, of the upper fastening portion T1 for the gusset 50 and the bracket 70. Accordingly, when the gusset 50 receives the impact load from the vehicle side and thereby some moment occurs in a specified direction (in an arrow M direction of FIG. 4) which may cause a rotation of the gusset 50 around the above-described inward fastening portion S2, that is—in a specified direction which may cause inward-falling down of the gusset 50), the gusset 50 can be more effectively restrained from falling down inward in the vehicle width direction improperly greatly, compared with a case in which the fastening portion T1 is arranged on the inward side, in the vehicle width direction, of the fastening portion S2. Accordingly, the stability of attaching of the gusset 50 at the time of the impact load being inputted from the vehicle side can be improved.

Further, in the attachment state shown in FIG. 4, the inward bead 99 of the bulkhead 90 is arranged to extend obliquely inward and downward from a vicinity of the inward fastening portion S2 for the gusset 50 and the floor panel 4. When the impact load inputted from the vehicle side is transmitted from the gusset 50 to the floor panel 4, a downward load may concentrate easily due to the above-described moment occurring at the above-described inward fastening portion S2. Herein, the above-described downward load can be transmitted further downward smoothly by way of the above-described bead 99 of the bulkhead 90. Thereby, load dispersion at the load transmission portion where the impact load is transmitted from the gusset 50 to the rear side frame 12 can be effectively attained, so that the collapsing of the cross section of the rear side frame 12 can be restrained further effectively. Accordingly, the load transmission from the gusset 50 to the rear side frame 12 as well as the load transmission at the rear side frame 12 can be attained properly.

The present invention should not be limited to the above-described embodiment, and any other modifications or improvements may be applied within the scope of a sprit of the present invention.

For example, while the above-described embodiment shows the case where the gusset 50 is fixed to the floor panel 4 and the bracket 70 at a pair of fastening portions S1, S2, T1, T2 respectively, the gusset 50 may be fixed to the floor panel 4 and the bracket 70 at one or three or more fastening portions respectively.

Also, while the above-described embodiment shows the case where the gusset 50 is foxed to the front portion of the rear-wheel house portion 34 via the bracket 70, the present invention is applicable to any structure in which a gusset formed integrally with a bracket is directly fixed to the front portion of the rear-wheel house portion 34. In this case, a fastening portion of the gusset to the rear-wheel house portion may be comprised of a single portion or plural portions.

What is claimed is:
1. A side vehicle-body structure of a vehicle, comprising:
a side panel constituting a vehicle-body side face positioned in back of a rear-door opening portion;

a rear-wheel house portion formed at the side panel and protruding inward in a vehicle width direction;

a floor panel constituting a vehicle-body bottom face; and a load transmitting member arranged on an inward side, in the vehicle width direction, of the side panel so as to transmit an impact load inputted to a rear door from a vehicle side, wherein said load transmitting member comprises a rising face portion which rises from said floor panel and a facing face portion which faces a portion of said side panel between a rear edge portion of the rear-door opening portion and the rear-wheel house portion, a longitudinal width of the load transmitting member is shorter than a vertical width of the load transmitting member, and the load transmitting member is fixed to a front portion of said rear-wheel house portion directly or via a bracket.

2. The side vehicle-body structure of a vehicle of claim 1, wherein said load transmitting member is fixed to said floor panel at a single or plural fastening portions thereof by means of a fastening member, said load transmitting member is further fixed to said bracket or said rear-wheel house portion at a single or plural fastening portions thereof by means of another fastening member, and said single fastening portion or the most inward-located portion of said plural fastening portions of the load transmitting member fixed to the floor panel is located at an inward position, in the vehicle width direction, relative to said single fastening portion or the most inward-located portion of said plural fastening portions of the load transmitting member fixed to the bracket or the rear-wheel house portion.

3. The side vehicle-body structure of a vehicle of claim 2, wherein said rising face portion of the load transmitting member is arranged substantially along a vertical direction in a vehicle side view.

4. The side vehicle-body structure of a vehicle of claim 3, wherein a rear side frame having a closed cross section and extending in a vehicle longitudinal direction is arranged along a lower face of said floor panel to pass below said load transmitting member, a bulkhead is arranged inside the closed cross section of said rear side frame and joined to an inner face of the rear side frame, and said bulkhead and the load transmitting member are arranged to overlap each other in the vehicle longitudinal direction.

5. The side vehicle-body structure of a vehicle of claim 2, wherein a rear side frame having a closed cross section and extending in a vehicle longitudinal direction is arranged along a lower face of said floor panel to pass below said load transmitting member, a bulkhead is arranged inside the closed cross section of said rear side frame and joined to an inner face of the rear side frame, and said bulkhead and the load transmitting member are arranged to overlap each other in the vehicle longitudinal direction.

6. The side vehicle-body structure of a vehicle of claim 5, wherein said load transmitting member is fixed to said floor panel at a single or plural fastening portions thereof by means of a fastening member, said load transmitting member is further fixed to said bracket or said rear-wheel house portion at a single or plural fastening portions thereof by means of another fastening member, and said single fastening portion or the most inward-located portion of said plural fastening portions of the load transmitting member fixed to the floor panel is located at an inward position, in the vehicle width direction, relative to said single fastening portion or the most inward-located portion of said plural fastening portions of the load transmitting member fixed to the bracket or the rear-wheel house portion.

7. The side vehicle-body structure of a vehicle of claim 6, wherein said rising face portion of the load transmitting member is arranged substantially along a vertical direction in a vehicle side view.

8. The side vehicle-body structure of a vehicle of claim 1, wherein said rising face portion of the load transmitting member is arranged substantially along a vertical direction in a vehicle side view.

9. The side vehicle-body structure of a vehicle of claim 1, wherein a rear side frame having a closed cross section and extending in a vehicle longitudinal direction is arranged along a lower face of said floor panel to pass below said load transmitting member, a bulkhead is arranged inside the closed cross section of said rear side frame and joined to an inner face of the rear side frame, and said bulkhead and the load transmitting member are arranged to overlap each other in the vehicle longitudinal direction.

10. The side vehicle-body structure of a vehicle of claim 9, wherein said load transmitting member has a lower-end flange portion placed on an upper face of said floor panel at a lower end thereof, said bulkhead has an upper-end flange portion contacting the lower face of the floor panel at an upper end thereof, and said lower-end flange portion of the load transmitting member and said upper-end flange portion of the bulkhead are fastened to each other, via the floor panel, at a single or plural fastening portions thereof by means of a fastening member.

11. The side vehicle-body structure of a vehicle of claim 10, wherein said bulkhead has a bead which is formed to extend downward from a vicinity of said single fastening portion or the most inward-located portion of said plural fastening portions of the upper-end flange portion of the bulkhead.

* * * * *